United States Patent
Evans et al.

(10) Patent No.: US 9,681,065 B2
(45) Date of Patent: Jun. 13, 2017

(54) GIMBAL POSITIONING WITH TARGET VELOCITY COMPENSATION

(75) Inventors: Stewart W. Evans, Keizer, OR (US); Anca G. Williams, Tualatin, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 897 days.

(21) Appl. No.: 12/816,308

(22) Filed: Jun. 15, 2010

(65) Prior Publication Data

US 2011/0304736 A1    Dec. 15, 2011

(51) Int. Cl.
| H04N 5/225 | (2006.01) |
| H04N 5/33 | (2006.01) |
| G01C 21/18 | (2006.01) |

(52) U.S. Cl.
CPC .............. *H04N 5/33* (2013.01); *G01C 21/18* (2013.01)

(58) Field of Classification Search
CPC .......... H04N 5/33; H04N 5/225; G01C 21/18; G01J 1/20
USPC ........ 348/169, 36; 701/2; 318/696; 356/5.02
See application file for complete search history.

(56) References Cited

U.S. PATENT DOCUMENTS

| 6,172,747 B1 | 1/2001 | Houlberg | |
| 2004/0118622 A1 | 6/2004 | Morrell et al. | |
| 2004/0207727 A1 | 10/2004 | von Flotow et al. | |
| 2006/0091844 A1* | 5/2006 | Shibatani | 318/696 |
| 2006/0274300 A1* | 12/2006 | Hinchliff et al. | 356/5.02 |
| 2008/0055413 A1 | 3/2008 | Hayashi | |
| 2008/0086241 A1* | 4/2008 | Phillips et al. | 701/2 |
| 2010/0017046 A1* | 1/2010 | Cheung | G01S 7/003 701/2 |
| 2010/0250022 A1* | 9/2010 | Hines | G05D 1/0094 701/2 |
| 2011/0069145 A1* | 3/2011 | Weber et al. | 348/36 |

OTHER PUBLICATIONS

Young, Lee W., Authorized officer; International Searching Authority, U.S. Patent and Trademark Office; International Search Report, PCT Application Serial No. PCT/US2010/038738; search date: Mar. 7, 2012; mail date: Mar. 20, 2012.
Young, Lee W., Authorized officer; International Searching Authority, U.S. Patent and Trademark Office; Written Opinion of the International Searching Authority, PCT Application Serial No. PCT/US2010/038738; completion date: Mar. 7, 2012; mail date: Mar. 20, 2012.

* cited by examiner

*Primary Examiner* — Richard Torrente
(74) *Attorney, Agent, or Firm* — Haynes and Boone, LLP

(57) ABSTRACT

A gimbal system, including components and methods of use, configured to track moving targets. More specifically, the disclosed system may be configured to orient and maintain the line of sight ("los") of the gimbal system toward a target, as the target and, in some cases, the platform supporting the gimbal system are moving. The system also may be configured to calculate an estimated target velocity based on user input, and to compute subsequent target positions from previous positions by integrating the estimated target velocity over time. A variety of filters and other mechanisms may be used to enable a user to input information regarding a target velocity into a gimbal controller.

20 Claims, 4 Drawing Sheets

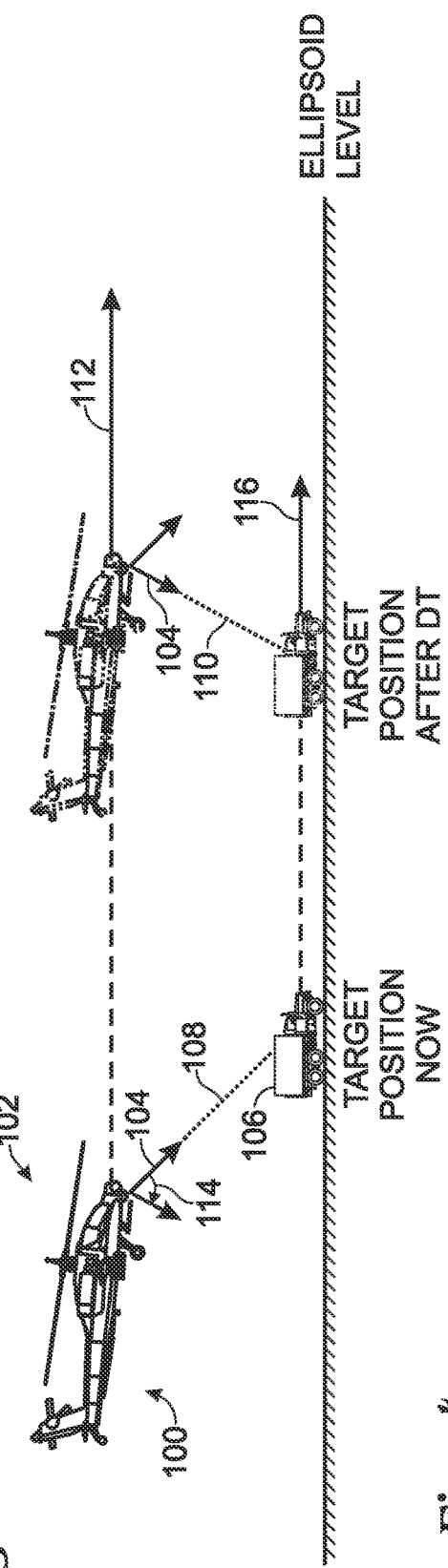
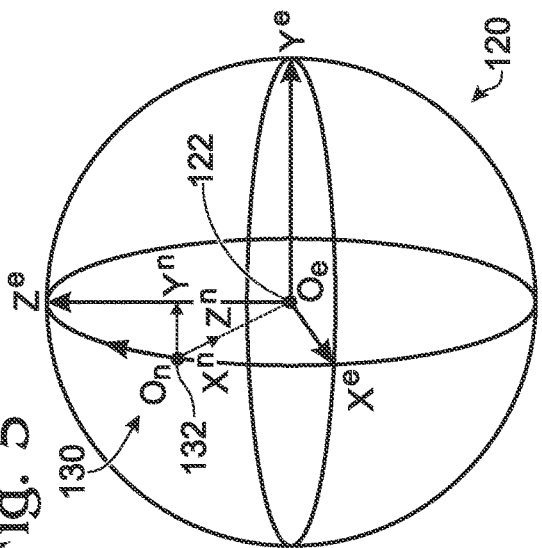
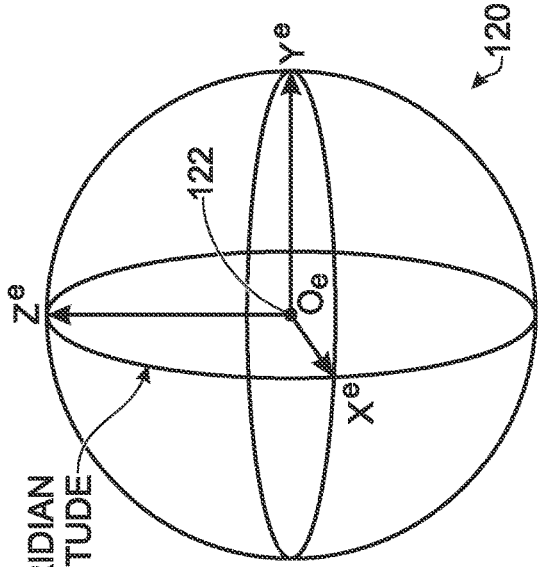

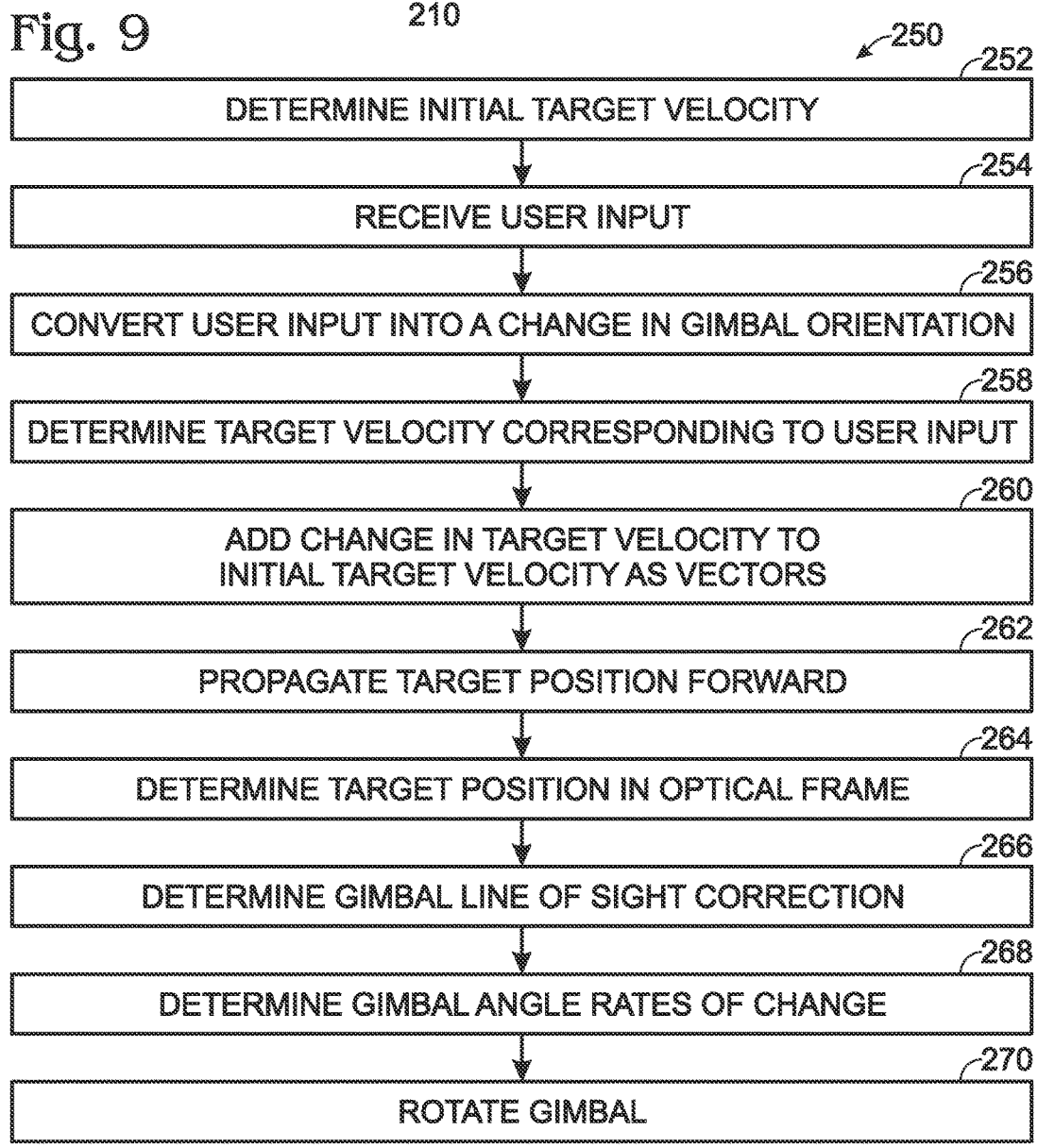

GIMBAL POSITIONING WITH TARGET VELOCITY COMPENSATION

INTRODUCTION

Imaging systems, light sources, weapons, and other devices can be mounted and used on a variety of supports. For example, moving vehicles, including various aircraft, watercraft, and ground vehicles, can provide versatile supports capable of transporting such devices. Many devices benefit from being easily and accurately pointed at a desired target. Gimbal systems can be used, alone or with gyroscopic stabilization, easily and accurately to point such devices without necessarily having to reorient the supports to which the devices are mounted.

Gimbal systems, as used herein, are any device-mounting mechanisms that include at least two different, typically mutually perpendicular, axes of rotation, thus providing angular movement in at least two directions (e.g., pan and tilt, among others). A gimbal system can include one or more constituent gimbals, each of which can rotate relative to one or more other constituent gimbals and/or a supported payload. A gimbal system also can include corresponding motors for rotating the various gimbals, control systems for controlling the various motors and/or payload components, gyroscopes for stabilizing the payload, and/or any other components used to aim and/or otherwise control the payload.

One use of gimbal systems includes tracking a target located at some position in three-dimensional space, such as an object on the surface of the ground or in the air, with a sensor or designator mounted within a gimbal. To accomplish effective tracking over a period of time, a gimbal mounted to a moving platform, such as an aircraft, may be configured to maintain its line of sight toward a particular target position once that position has been determined. However, keeping the gimbal pointing toward a target object becomes more complicated when the target itself is moving. Accordingly, improved gimbal tracking systems are needed to track moving targets effectively.

SUMMARY

The present disclosure provides a gimbal system, including components and methods of use, configured to track moving targets. More specifically, the disclosed system may be configured to orient and maintain the line of sight ("los") of the gimbal system toward a target, as the target and, in some cases, the platform supporting the gimbal system are moving. The system also may be configured to calculate an estimated target velocity based on user input, and to compute subsequent target positions from previous positions by integrating the estimated target velocity over time. A variety of filters and other mechanisms may be used to enable a user to input information regarding a target velocity into a gimbal controller.

BRIEF DESCRIPTION OF THE DRAWINGS

FIG. 3 is a schematic view of a gimbal system with target velocity compensation being used to track a target, in accordance with aspects of the present disclosure.

FIG. 4 illustrates an earth-centered earth-fixed (ECEF) ("e") coordinate system, in accordance with aspects of the present disclosure.

FIG. 5 illustrates a navigation ("n") coordinate system, in accordance with aspects of the present disclosure.

FIG. 8 is a vector diagram depicting vectors used to determine the line-of-sight-to-target vector, in accordance with aspects of the present disclosure.

FIG. 9 is a flow chart depicting an exemplary method of tracking a moving target with a gimbal-mounted sensor, in accordance with aspects of the present disclosure.

DETAILED DESCRIPTION

The present disclosure provides a gimbal system, including components and methods of use, configured to track moving targets. More specifically, the disclosed system may be configured to orient and maintain the line of sight ("los") of the gimbal system toward a target, as the target and, in some cases, the platform supporting the gimbal system are moving. The system also may be configured to calculate an estimated target velocity based on user input, and to compute subsequent target positions from previous positions by integrating the estimated target velocity over time. A variety of filters and other mechanisms may be used to enable a user to input a target velocity into a gimbal controller. Further aspects of the system are described below, including (I) an overview of an exemplary gimbal system with target velocity compensation, (II) coordinate systems, (III) system parameters, (IV) transformations between coordinate systems, (V) tracking systems, (VI) mounting/control portions, (VII) gimbal assemblies, (VIII) payloads, (IX) support platforms, (X) definitions, and (XI) examples.

I. OVERVIEW OF AN EXEMPLARY GIMBAL SYSTEM

Figure 1:
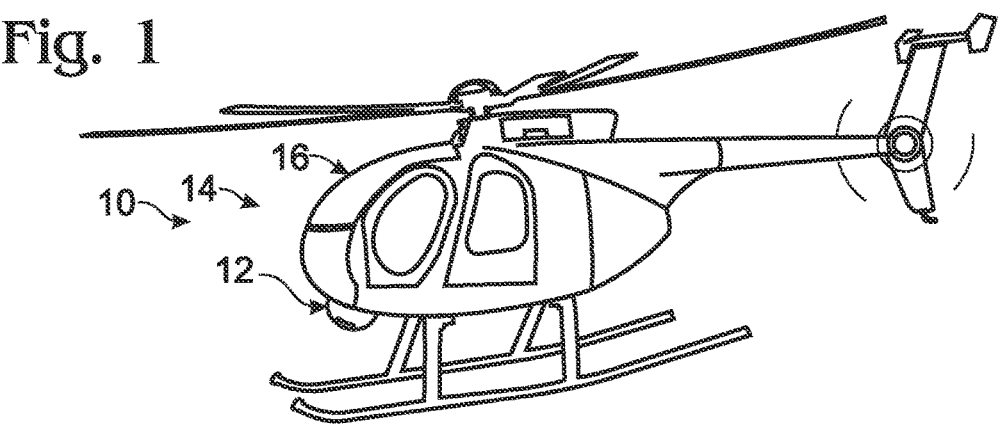
FIG. 1 is a view of an exemplary gimbal system with target velocity compensation mounted to an exterior of a support platform (namely, a helicopter), in accordance with aspects of the present disclosure.

FIG. 1 shows an exemplary gimbal system 10 with target velocity compensation, in accordance with aspects of the present disclosure. Gimbal system 10 may include a turret unit 12 (also termed a gimbal apparatus), which supports and orients a payload that may include a tracking device, mounted on a support platform 14. Here, the support platform is a helicopter, with the turret unit mounted on the exterior of the vehicle. A user interface unit and portions of an associated controller may be located inside the vehicle or, in some cases, remotely (e.g., in a command center). The turret unit may have a compact, aerodynamic configuration, with sensitive components, such as electronics and/or the payload, enclosed for protection from ambient (external) air, to minimize exposure to moisture, salt, particulates, etc. The position of the support platform, if movable, may be determined as a function of time using any suitable mechanism(s), such as a global positioning system (GPS) device and/or an inertial navigation system (INS) associated with the platform, among others. The tracking device in the gimbal payload may, for example, be a camera, a laser, a sensor, and/or any other device capable of sensing, marking, illuminating, or otherwise distinguishing or identifying a desired target. The target may be stationary or moving with a nonzero velocity, and may be disposed on the surface of the earth or at some other position within the line of sight of the tracking device.

The system may include one or more controllers. A controller, as used herein, is any device that operates the gimbal system, and components thereof, including tracking, generally automatically. The controller may include a local controller, such as the mount/gimbal controller described below, and/or a remote computing device. The controller may include a processor that can perform arithmetic and/or logical operations on data, such as position and velocity data, and generate commands such as servo commands that control the gimbal assembly and reorient the associated payload. The controller may include memory to store instructions and/or data. The controller may be connected with user input and output devices, and portions of the controller may be connected with each other, using any suitable connections, including wires, optical conduits, and/or wireless connections.

Figure 2:
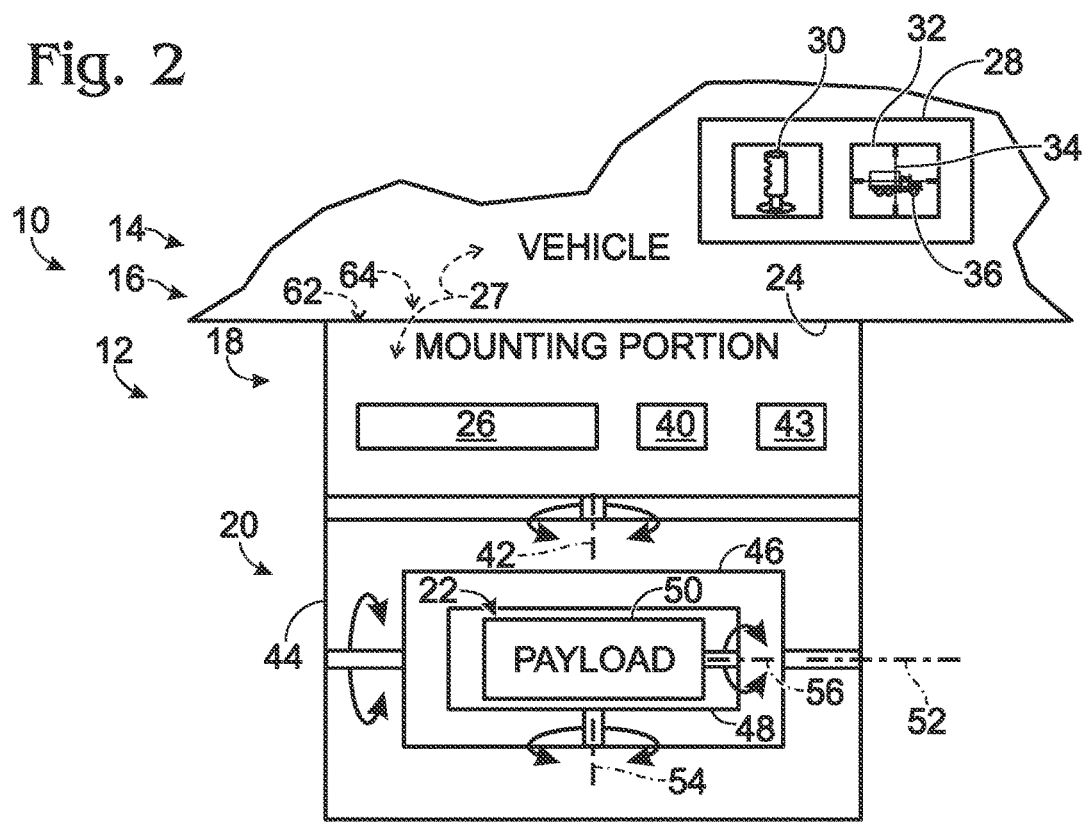
FIG. 2 is a schematic view of selected aspects of the gimbal system of FIG. 1, including a user interface, in accordance with aspects of the present disclosure.

FIG. 2 shows a schematic view of selected aspects, including further details, of system 10. Turret unit 12 may include a mounting portion 18 (also or alternatively termed a control portion), a gimbal assembly 20, and a payload 22. Mounting portion 18 may be fixed to support platform 14, such that the mounting portion is at least substantially stationary with respect to the support platform. Gimbal assembly 20 may be connected to and supported pivotably by mounting portion 18. Thus, the mounting portion may function as a connecting bridge between support platform 14 and gimbal assembly 20. Payload 22, in turn, may be connected to and supported by gimbal assembly 20, and may be oriented controllably with respect to the mounting portion (and the support platform) by driven motion (e.g., motor-driven motion) of gimbal assembly 20.

Mounting portion 18 alone or collectively with gimbal assembly 20 may form a chamber 24 in which internal components of the mounting portion are housed. The chamber may provide a separate internal air space, which may be desiccated and isolated physically (although not necessarily sealed hermetically), to protect the internal components from water vapor, dust, rain, snow, debris, insects, etc. These internal components may include electronic components, generally termed electronics 26 (e.g., one or more circuit boards). Electronics 26 may form at least a portion of a controller 27 of the turret unit. The controller may be in communication with a user interface unit 28, which may permit a user to communicate with the controller, such as by inputting commands to the controller and/or receiving data (e.g., image and/or video data) from the controller. For example, the user interface unit may include a joystick 30 or other user input device(s), for inputting commands, and a display 32 or other user output device(s), for receiving and presenting data. The display, in turn, may include a reference mark 34, such as cross-hairs, with which an image 36 of the target may be aligned or otherwise referenced. The mounting portion may further comprise a drive assembly 40 to drive pivotal motion of the gimbal assembly with respect to the mounting portion about a first axis 42 (e.g., an azimuthal axis). The drive assembly may include a drive motor, one or more gears, and the like. Furthermore, the mounting portion may comprise a pointing sensor 43 (e.g., an encoder), a bearing, and the like.

Turret unit 12 may be utilized to aim payload 22, such as a camera or marker, with respect to support platform 14. In particular, the turret unit may aim the payload by controlled pivotal movement of constituent gimbals 44-50 of gimbal assembly 20 relative to support platform 14, based on direct input from a user (e.g., via a joystick) and/or via an automatic tracking system (e.g., from a target velocity compensation system). For example, the angular orientation of the payload may be adjusted horizontally and vertically via the gimbals without changing the orientation of the support platform. Alternatively, or in addition, the angular orientation of the payload may be adjusted to compensate for changes in the orientation and/or position of the support platform and/or motion of the target. Accordingly, the turret unit may allow one or more fixed and/or moving objects/scenes to be detected over time from a fixed and/or moving support platform 14.

Gimbal assembly 20 may include, among others, an outer gimbal 44 (also termed an azimuthal gimbal) and an inner gimbal 46 (also termed an elevational gimbal). Gimbal assembly 20 may be coupled pivotably to mounting portion 18 via outer gimbal 44, for controlled, driven pivotal movement of the entire gimbal assembly (and the outer gimbal) about first axis 42 (e.g., a generally vertical axis). Inner gimbal 46 may be pivotably coupled to mounting portion 18 through outer gimbal 44, such that the outer gimbal carries the inner gimbal. Inner gimbal 46 may undergo pivotal movement about a second axis 52 (e.g., a generally horizontal axis, also termed an elevational axis) that is nonparallel (e.g., transverse and/or orthogonal) to first axis 42. Payload 22 may be connected to mounting portion 18 via inner gimbal 46. Accordingly, pivotal movement of outer gimbal 44 and/or inner gimbal 46 may aim the payload in relation to first and second axes 42, 52. In some embodiments, the payload may be connected pivotably to inner gimbal 46 via one or more additional gimbals 48, 50 that pivot about one or more additional axes 54, 56. For example, controlled pivotal movement of outer and inner gimbals 44, 46 (major gimbals) may provide coarser adjustments to the orientation of payload 22, and controlled pivotal movement of additional gimbals 48, 50 (minor gimbals) may provide finer adjustments to the orientation (or vice versa).

Turret unit 12 may include a thermal regulation system that operates to provide feedback-regulated control of temperature within the turret unit, and particularly mounting portion 18. An exemplary thermal regulation system is described in U.S. Provisional Patent Application Ser. No. 61/296,336, filed Jan. 19, 2010 [FSI 329P].

Turret unit 12 may include a position control system 62. System 62 may operate to provide controlled positioning of the payload. The position control system may include controller 27, a driver(s) (e.g., a driver for each gimbal), and an encoder(s) (e.g., an encoder for each gimbal). The driver(s) may drive pivotal movement of each gimbal under the control of the controller. The encoder(s) may measure the position of the gimbal before, during, and/or after movement of each gimbal by the driver(s), to provide feedback information to the controller for further operation of the driver(s) and/or to allow the current position of a gimbal to be recorded and/or reported. The position control system further may include one or more gyroscopes to stabilize the position of the gimbals and/or the payload.

Turret unit 12 may include a power supply 64. The power supply may include any mechanism for supplying power, such as electrical power, to thermal regulation system 58, position control system 62, and electronics 26, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

Additional features and aspects that may be suitable for the gimbal system are disclosed in U.S. Patent Application Publication No. 2007/0194170 A1, published Aug. 23, 2007, which is incorporated herein by reference.

FIG. 3 schematically depicts a tracking system, generally indicated at 100, configured to maintain its line of sight toward a target. Tracking system 100 may be mounted on a suitable platform 102, which may be an aircraft, among others. The line of sight of the tracking device, which is generally indicated at 104, may be initially directed toward a desired target 106 using any suitable mechanism. In some cases, the initial target position may be acquired manually. For example, line of sight 104 may be adjusted with a user-operated joystick or other input device connected to a gimbal controller until the tracking device acquires the target. Alternatively, if the target position is known in some coordinate system, the target may be acquired by manually entering target coordinates into the gimbal controller. In other cases, a target position may be pre-programmed or sensed automatically (for example, through shape, size, color, pattern, and/or other forms of automated recognition), in which case user input may not be needed to acquire the target initially.

After the target has been acquired, tracking involves providing the targeting system with instructions that allow it to remain pointing at the target, despite the movements of the platform and target. The line of sight toward target 106 at a first time is indicated in FIG. 3 at 108, and the line of sight toward target 106 at a second, later time is indicated at 110. The movements of platform 102 that affect pointing may include both translations (i.e., overall center-of-mass movement of the platform), indicated by platform velocity vector 112, and rotations (e.g., pitching, rolling, and yawing of the platform), indicated by platform angular velocity vector 114. The movements of the target that affect pointing generally only include translations, indicated by target velocity vector 116, because rotation of the target will not affect whether it remains in view.

The instructions for pointing may involve continuously or periodically specifying a line of sight vector, and changes thereof, from the tracking system, such as a tracking device supported by a gimbal system, to the target. The determination of the line of sight vector, and any changes thereto, may involve transformations between different coordinate systems and/or rotations within a given coordinate system, as described below.

II. COORDINATE SYSTEMS

Positions, such as platform position and target position, may be described using three-dimensional (3D) vectors. Vectors, in turn, may be represented as a set of coordinates, corresponding to a magnitude and direction, in some suitable reference frame or coordinate system. For example, a displacement vector extending from a point i, such as a tracking device, to a point j, such as a target, may be represented in a coordinate system f using the notation ${}^f\vec{X}_i^j$ or simply ${}^fX_i^j$, where it is understood that the denoted quantity is a vector in either case. Similarly, a velocity vector pointing in the direction from point i to point j in coordinate system f may be represented as ${}^f\vec{V}_i^j$ or, for simplicity, just ${}^fV_i^j$. This section describes various coordinate systems that may be used to describe displacement and velocity vectors and thus the relative positions and motions of objects. The coordinate systems described below with respect to aircraft and gimbals may, more generally, be described with reference to any suitable object(s).

FIG. 4 depicts an "earth-centered earth-fixed (ECEF) frame" coordinate system (denoted herein by a superscript or subscript "e"), generally indicated at 120. The ECEF frame measures position with respect to an origin 122 ($O_e$) at the center of the earth. Positions in the ECEF frame may be provided in Cartesian coordinates (x, y, z) or geodetic coordinates (latitude, longitude, altitude), among others. In Cartesian coordinates, the x-axis is typically taken to point toward the prime meridian (0° longitude), the y-axis is typically taken to point toward 90 degrees east longitude, and the z-axis is typically taken to point toward geographic north (the north pole).

FIG. 5 depicts a "navigation frame" coordinate system (denoted herein by a superscript or subscript "n"), generally indicated at 130. The navigation frame is a local level frame that travels along with the platform with which it is associated, with its origin 132 ($O_n$) at some predetermined position (such as the platform center of mass) determined by the platform. The navigation frame has its x-axis pointing local north (defined by the local meridian), its y-axis pointing east, and its z-axis pointing straight down, toward the center of the earth, regardless of the orientation of the aircraft.

Figure 6:
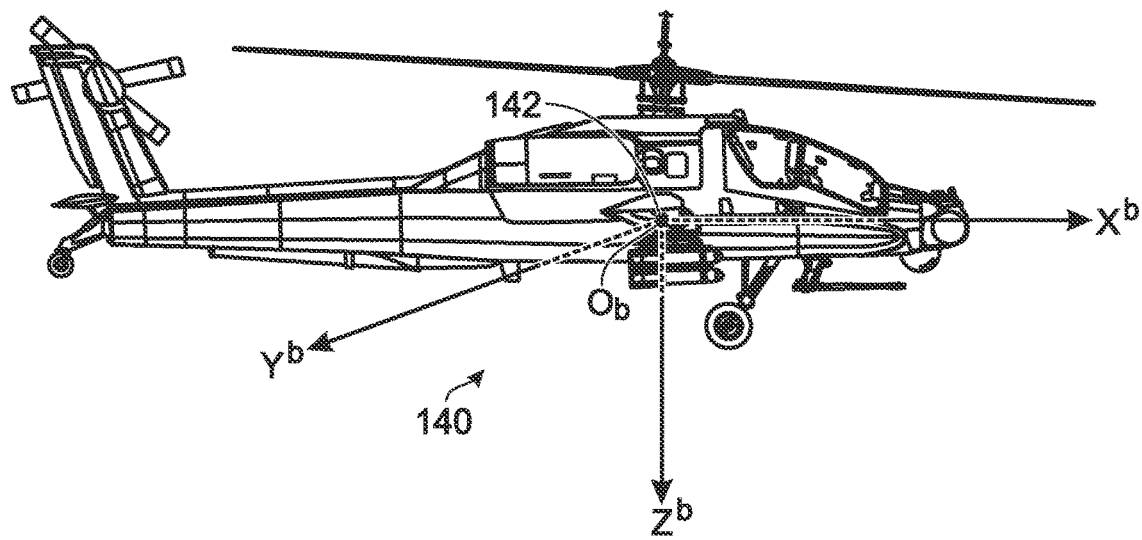
FIG. 6 illustrates an aircraft body ("b") coordinate system, in the context of a gimbal system mounted on a helicopter, in accordance with aspects of the present disclosure.

FIG. 6 depicts a "body frame" coordinate system (denoted herein by a superscript or subscript "b"), generally indicated at 140. The body frame also moves along with the platform with which it is associated, with its x-axis pointing aircraft (or platform) forward, its y-axis pointing out the right wing (or the equivalent), and its z-axis pointing down, through the bottom of the platform, to form a right-handed coordinate system. The body frame is related to the navigation frame through pitch, roll, and yaw rotations that transform from the local level frame to the actual orientation of the aircraft or other platform. Accordingly, the body frame typically has its origin 142 ($O_b$) at the same location as the origin of the navigation frame, such as the center of mass of the platform.

Figure 7:
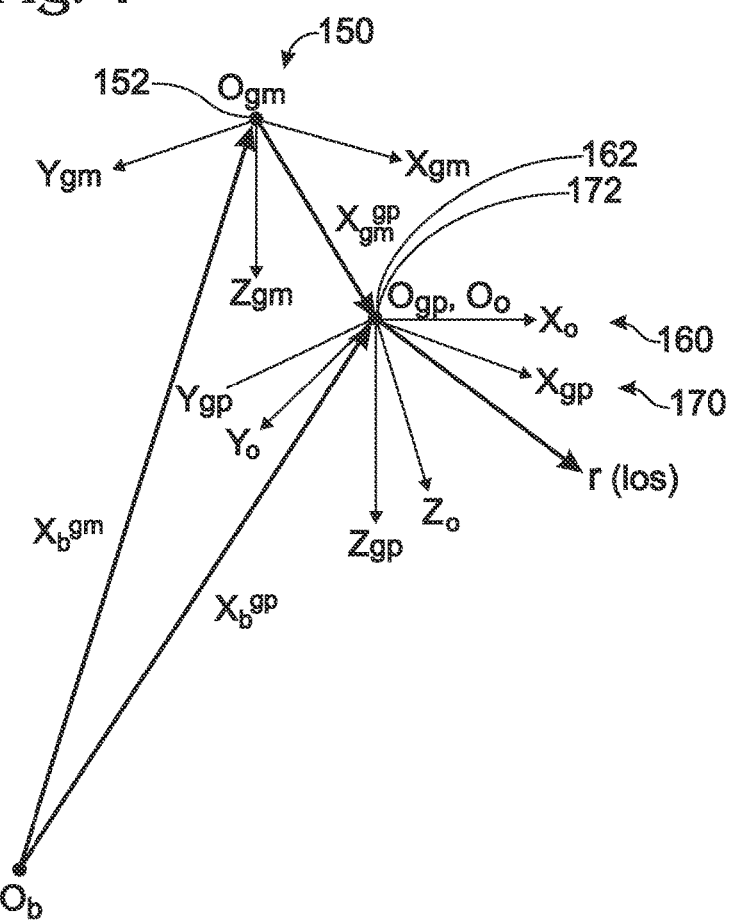
FIG. 7 illustrates gimbal mount ("gm"), gimbal payload ("gp"), and optical ("o") coordinate systems, in accordance with aspects of the present disclosure.

FIG. 7 depicts three additional coordinate systems, referenced with respect to a gimbal system, and the relationships between them: (1) the "gimbal mount frame" coordinate system (denoted herein by a superscript or subscript "gm" and generally indicated at 150), (2) the "gimbal payload frame" coordinate system (denoted herein by a superscript or subscript "gp" and generally indicated at 160), and (3) the "optical frame" coordinate system (denoted herein by a superscript or subscript "o" and generally indicated at 170).

The gimbal mount frame 150 defines the physical mounting point of the gimbal to the aircraft and its unrotated orientation. It has its origin 152 ($O_{gm}$) at the top of the gimbal bolt pattern, and when the gimbal is at zero azimuth and elevation (i.e., unrotated) relative to the mount, the x-axis of the gimbal mount frame points along the line of sight of the active sensor, the y-axis points out the right side of the gimbal, and the z-axis points down through the bottom of the gimbal.

The gimbal payload frame 160 defines the orientation of the gimbal relative to the gimbal mount frame. It has its origin 162 ($O_{gp}$) at the center of rotation of the gimbal (like the optical frame described below), its x-axis pointing out from the "ear" of the gimbal, its z-axis pointing along the payload bore-sight, and its y-axis finishing a right-handed coordinate system. Because, as FIG. 7 depicts, the gimbal payload frame is related to the optical frame by a fixed (constant) rotation, it is assumed in the remainder of this description that the gimbal payload frame 160 will be calibrated to the optical frame 170.

The optical frame 170, which is closely related to two other gimbal frames of reference, has its origin 172 ($O_o$) at the center of rotation of the gimbal and is defined by the direction of the true line-of-sight of the active gimbal sensor. A gimbal controller typically sends rotation commands to a gimbal in the form of azimuth, elevation and/or roll angles relative to the existing line of sight of this active sensor, thus supplying commands in the optical frame.

III. SYSTEM PARAMETERS

Tracking systems according to the present disclosure make use of the known, calculable and/or or estimated positions and motions of the targeting system and target. Typically, the position, orientation and motion of the tracking system will be known and may be referred to herein as the "navigation solution." In some cases, the position and motion of the target will also be known. In other cases, the position and motion of the target may be calculated or estimated based on known system parameters and/or user input.

The movement of the platform may be described using a flight path vector such as a flight path trajectory vector or a flight path velocity vector. These vectors may be represented with respect to any coordinate system. The flight path trajectory vector is a position vector of known length (such as unit length) that points in the instantaneous direction of the platform motion. The flight path velocity vector is a function of position and time (because velocity is defined as a change in position with respect to time, for example, in meters per second) that also points in the instantaneous direction of the platform motion.

The symbol used herein for the direction of the flight path is "F". Using this notation, a trajectory vector in the direction of the flight path, referenced to the navigation frame, would be denoted as ${}^n\vec{X}_o^F$, where the "O" indicates that the vector starts at the origin of the navigation frame, the "F" indicates that the vector points in the direction of the flight path, and the "n" indicates that the vector is given in the navigation coordinate system. Similarly, a velocity vector in the direction of the flight path would be expressed in the navigation frame as ${}^n\vec{V}_o^F$. The symbol that may be used herein in a similar manner to denote the direction of flight path acceleration is "FA".

The position of the target may be described using a target position vector. This vector may be represented with respect to any coordinate system. The symbol used herein for target is "T". Using this notation, a target position expressed in the ECEF coordinate system would be denoted by ${}^e\vec{X}_e^T$. The movement of the target (i.e., the change in the position of the target) may be described using a target velocity vector denoted by the symbol V. This vector also may be represented with respect to any coordinate system. For each frame chosen, the velocity vector represents the discrete-time derivative of the target position vector. Using this notation, a target velocity vector expressed in the ECEF frame would be denoted by ${}^e\vec{V}_e^T$.

IV. TRANSFORMATIONS BETWEEN COORDINATE SYSTEMS

Vectors, such as a line of sight displacement vector between a tracking device and target, are independent of frame or coordinate system. However, the representation of a vector in one frame or coordinate system typically will differ from the representation of the same vector in another coordinate system. This section describes exemplary mathematical methods, such as the use of rotation matrices, for transforming vectors from one coordinate system to another. Such transformations may be effected, for example, using a suitable direction cosine matrix (DCM). In particular, $C_x^y$ will be used to denote a matrix that transforms a vector from coordinate system x to coordinate system y, where the transformation is accomplished by multiplying the original vector by the DCM to obtain a transformed vector, according to the ordinary methods of linear algebra.

A. Earth-centered Earth-Fixed to Navigation Frame. Given the latitude and longitude of a reference frame position, the position can be transformed into the local geodetic frame ("g") using the following DCM, where "s" stands for sine and "c" stands for cosine. Because the local geodetic frame is the same as the navigation frame when the wander azimuth is zero, which it is assumed to be for purposes of this description, this may also be viewed as a transformation from the ECEF frame into the navigation frame:

$$C_e^n = C_e^g = \begin{bmatrix} -slat*clon & -slat*slon & clat \\ -slon & clon & 0 \\ -clat*clon & -clat*slon & -slat \end{bmatrix}$$

This matrix can be constructed from three successive rotations as follows:

1. Longitude Rotation (about z):

$$\begin{bmatrix} x' \\ y' \\ z' \end{bmatrix} = \begin{bmatrix} clon & slon & 0 \\ -slon & clon & 0 \\ 0 & 0 & 1 \end{bmatrix} \begin{bmatrix} x \\ y \\ z \end{bmatrix}$$

2. Latitude Rotation (about y'):

$$\begin{bmatrix} x'' \\ y'' \\ z'' \end{bmatrix} = \begin{bmatrix} clat & 0 & slat \\ 0 & 1 & 0 \\ -slat & 0 & clat \end{bmatrix} \begin{bmatrix} x' \\ y' \\ z' \end{bmatrix}$$

$$= \begin{bmatrix} clat*clon & clat*slon & slat \\ -slon & clon & 0 \\ -slat*clon & -slat*slon & clat \end{bmatrix} \begin{bmatrix} x \\ y \\ z \end{bmatrix}$$

3. Up-east-north to north-east-down:

$$\begin{bmatrix} x''' \\ y''' \\ z''' \end{bmatrix} = \begin{bmatrix} 0 & 0 & 1 \\ 0 & 1 & 0 \\ -1 & 0 & 0 \end{bmatrix} \begin{bmatrix} x'' \\ y'' \\ z'' \end{bmatrix}$$

$$= \begin{bmatrix} -slat*clon & -slat*slon & clat \\ -slon & clon & 0 \\ -clat*clon & -clat*slon & -slat \end{bmatrix} \begin{bmatrix} x \\ y \\ z \end{bmatrix}$$

To transform from the navigation frame to the ECEF, the transpose of the above matrix may be used. This transpose matrix can be found through standard methods of linear algebra.

B. Navigation Frame to Body Frame. A matrix for transforming from the navigation frame to the body frame also can be constructed by viewing the transformation as three successive rotations, as shown below, where "y"=yaw angle, "p"=pitch angle, and "r"=roll angle:

1. Yaw (z) rotation:

$$\begin{bmatrix} x' \\ y' \\ z' \end{bmatrix} = \begin{bmatrix} cy & sy & 0 \\ -sy & cy & 0 \\ 0 & 0 & 1 \end{bmatrix} \begin{bmatrix} x \\ y \\ z \end{bmatrix}$$

2. Pitch (y) rotation:

$$\begin{bmatrix} x' \\ y' \\ z' \end{bmatrix} = \begin{bmatrix} cp & 0 & -sp \\ 0 & 1 & 0 \\ sp & 0 & cp \end{bmatrix} \begin{bmatrix} x \\ y \\ z \end{bmatrix}$$

$$\begin{bmatrix} x' \\ y' \\ z' \end{bmatrix} = \begin{bmatrix} 1 & 0 & 0 \\ 0 & cr & sr \\ 0 & -sr & cr \end{bmatrix} \begin{bmatrix} x \\ y \\ z \end{bmatrix}$$

3. Roll (x) rotation:
Multiplying these three rotation matrices:

$$C_n^b = \begin{bmatrix} 1 & 0 & 0 \\ 0 & cr & sr \\ 0 & -sr & cr \end{bmatrix} \begin{bmatrix} cp & 0 & -sp \\ 0 & 1 & 0 \\ sp & 0 & cp \end{bmatrix} \begin{bmatrix} cy & sy & 0 \\ -sy & cy & 0 \\ 0 & 0 & 1 \end{bmatrix}$$

$$= \begin{bmatrix} cp & 0 & -sp \\ sr*sp & cr & sr*cp \\ cr*sp & -sr & cr*cp \end{bmatrix} \begin{bmatrix} cy & sy & 0 \\ -sy & cy & 0 \\ 0 & 0 & 1 \end{bmatrix}$$

$$= \begin{bmatrix} cp*cy & cp*sy & -sp \\ sr*sp*cy-cr*sy & sr*sp*sy+cr*cy & sr*cp \\ cr*sp*cy+sr*sy & cr*sp*sy-sr*cy & cr*cp \end{bmatrix}$$

Again, the reverse transformation may be accomplished using the transpose of the above matrix.

C. Gimbal Mount Frame to Optical Frame. This transformation may be accomplished with the following DCM, which may be derived in similar fashion to the previous transformation matrices. In the matrix below, "El" stands for elevation angle, "Az" stands for azimuth angle (both of the line of sight with respect to the gimbal mount), and "s" and "c" stand for sine and cosine as before:

$$C_{gm}^o = \begin{bmatrix} cElcAz & cElsAz & -sEl \\ -sAz & cAz & 0 \\ sElcAz & sElsAz & cEl \end{bmatrix}$$

To rotate from the optical frame to the gimbal mount frame, the transpose of the above DCM may be used:

$$C_o^{gm} = (C_{gm}^o)^T.$$

D. Optical Frame to Azimuth, Elevation. This DCM is used to rotate a vector from the optical frame (o) to gimbal azimuth yoke frame. It is typically followed by a transformation that extracts the gimbal azimuth and elevation angles, which is denoted "gmb_los2azel" below. The gimbal angle inputs are in spherical coordinates for azimuth, elevation and roll:

$$\begin{bmatrix} x' \\ y' \\ z' \end{bmatrix} = C_o^{gmb} \begin{bmatrix} x \\ y \\ z \end{bmatrix} = \begin{bmatrix} c(\text{gmb\_El}) & 0 & -s(\text{gmb\_El}) \\ 0 & 1 & 0 \\ s(\text{gmb\_El}) & 0 & c(\text{gmb\_El}) \end{bmatrix} \begin{bmatrix} x \\ y \\ z \end{bmatrix}$$

$$\text{gmb\_los2azel}\left(\begin{bmatrix} x' \\ y' \\ z' \end{bmatrix}\right) = \begin{bmatrix} \tan^{-1}\left(\frac{x'}{y'}\right), -\tan^{-1}\left(\frac{z}{\sqrt{(x')^2+(y')^2}}\right) - \text{gmb\_El} \end{bmatrix}$$

V. TRACKING SYSTEMS

The purpose of a tracking system according to the present disclosure is, in brief, to determine the line of sight vector from the tracking system to a target and then to adjust that line of sight, as needed, to compensate for movements of the platform and/or target.

A. Pointing at a Target

FIG. 8 is a vector diagram, generally indicated at 200, that depicts how to determine the line-of-sight-to-target vector 202 from the respective position vectors 204, 206 of the gimbal rotation center (GRC) 208 and the target 210 in the ECEF coordinate system, at any given instant, in accordance with aspects of the present disclosure. The GRC is the center of the gimbal payload, where the rotation axis for azimuth and elevation intersect. Here, determining the line of sight vector 202 is a matter of subtracting the GRC position vector 204 (i.e., the position vector for the origin of the optical frame) from the target position vector 206, i.e., ${}^e\vec{X}_o^t = {}^e\vec{X}_e^t - {}^e\vec{X}_e^o$. The positions of GRC 208 and target 210 in ECEF coordinates can be determined using GPS position data, INS position data, terrestrial navigation data, or the like, or a combination thereof. In some cases, the GRC position may be determined from the INS position using the orientation of the platform and the known translational offset between the INS and the GRC.

Once a line of sight vector has been determined in the ECEF system at a particular instant of time, it is typically desirable to transform this into commands that will cause the gimbal (and thus the sensor) to rotate through azimuth and elevation angles until the gimbal points in the desired direction. Because these angles depend on the position and orientation of the gimbal, the transformation generally involves transforming the line of sight vector from the ECEF frame to the navigation frame, and then from the navigation frame to the optical frame. Once the line of sight vector is known in the optical frame, it may be converted to equivalent azimuth and elevation angles, which may be sent as commands to the gimbal controller. All of these transformations are described above in Section IV.

B. Example 1

As described above, transforming platform and target positions into gimbal rotation commands that result in pointing a sensor at a target generally may be accomplished through the application of various vector rotations and coordinate transformations. For example, using the previously introduced notation, an exemplary transformation procedure would include the following steps, where it is assumed that the gimbal and target positions are known in the ECEF coordinate system.

Starting with the gimbal and target position vectors in the ECEF frame, the gimbal to target displacement vector may be determined in the ECEF frame by vector subtraction:

$${}^e\vec{X}_o{}^t = {}^e\vec{X}_e{}^t - {}^e\vec{X}_e{}^o$$

The target displacement vector then may be determined in the navigation frame and the optical frame through successive application of the appropriate transformation matrices:

$${}^n\vec{X}_o{}^t = C_e^n \times {}^e\vec{X}_o{}^t$$

$${}^o\vec{X}_o{}^t = C_n^b \times {}^n\vec{X}_o{}^t = (C_b^n)^T \times {}^n\vec{X}_o{}^t$$

The target displacement vector then may be rotated from the optical frame into the gimbal azimuth yoke frame:

$${}^{gmb}\vec{X}_o{}^t = C_b^{gmb} \times {}^o\vec{X}_o{}^t$$

Finally, the azimuth and elevation "errors" (i.e., corrections) for the gimbal may be determined from the target displacement vector in the gimbal azimuth yoke frame:

$$[AZ_E, EL_E] = gmb\_los2azel({}^{gmb}\vec{X}_o{}^t).$$

C. Allowances for Motion

While the description above allows a sensor line of sight to be rotated toward a desired target at one instant of time, it does not compensate for motions of either the gimbal platform or the target. FIG. 3, described previously, depicts the relationship between flight path trajectory and target position vectors at two different times (t and t+dt), in accordance with aspects of the present disclosure. As FIG. 3 suggests, determining the line of sight vector from a moving platform to a moving target at various times involves determining the position of the target in the optical frame as a function of time, based on (i) a known or calculable change in position of the platform, and (ii) a known, calculable, or user-provided change in position of the target. This can generally be done in conjunction with the previously described techniques for determining a line of sight vector and gimbal rotation corrections at a single instant of time, by including transformations that compensate for the platform and target motions.

D. Example 2

The rates of change of the gimbal azimuth and elevation angles to keep the gimbal line of sight pointed toward the target may be determined from (i) an initially determined target displacement vector in the navigation frame, (ii) initially determined azimuth and elevation angles to point the gimbal toward the target, and (iii) the known or estimated velocities of the gimbal platform and the target, as described below.

A new target displacement vector may be determined from the previous target displacement vector by subtracting the change in position of the platform and adding the change in position of the target:

$${}^n\vec{X}_o{}^{T(t+\Delta t)} = {}^n\vec{X}_o{}^{T(t)} - {}^n\vec{X}_o{}^F + {}^n\vec{V}_T \Delta t$$

The new target displacement vector then may be rotated into the optical frame:

$${}^o\vec{X}_o{}^{T(t+\Delta t)} = C_b^n \times {}^n\vec{X}_o{}^{T(t+\Delta t)}$$

and then into the gimbal azimuth yoke frame:

$${}^{gmb}\vec{X}_o{}^{T(t+\Delta t)} = C_b^{gmb} \times {}^o\vec{X}_o{}^{T(t+\Delta t)}.$$

From this, a new azimuth and elevation correction corresponding to time (t+Δt) can be determined:

$$[AZ_E(t+\Delta t), EL_E(t+\Delta t)] = gmb\_los2azel({}^{gmb}\vec{X}_o{}^{t+\Delta t}).$$

Finally, the rates of change of the gimbal azimuth and elevation corrections can be calculated from the two time-separated values of each correction:

$$AZ_{rate} = [AZ_E(t+\Delta t) - AZ_E(t)]/\Delta t$$

$$EL_{rate} = [EL_E(t+\Delta t) - EL_E(t)]/\Delta t$$

Although both the platform velocity and the target velocity are assumed constant in the steps shown above, the disclosed techniques may be generalized to include the possibility of constant acceleration or even variable acceleration of the platform and/or the target. The main effect of such complications is to increase the amount of data processing required to carry out the calculations.

E. User Input

Although techniques for retaining a gimbal line of sight toward a target have already been described above, in some cases it may be desirable to provide additional features that allow a user to adjust a gimbal orientation manually, for example to compensate for unpredictable changes in target velocity. In such cases, the target velocity as a function of time may not be a known or predictable quantity, so that manual user input, possibly in combination with one or more tracking algorithms, may be the best method of tracking the moving target. User input may be accomplished, for example, in conjunction with an input device such as a joystick or similar directional indicator, as described below.

FIG. 9 is a flow chart depicting a method, generally indicated at 250, of tracking a moving target with a gimbal-mounted sensor, in accordance with aspects of the present disclosure. The method of FIG. 9 generally includes combining one or more tracking algorithms, such as those described above, with user input indicating a change in target velocity. To correctly calibrate a user's input relating to target velocity, it is helpful to determine an initial target velocity, as indicated at step 252. This can be accomplished using the "navigation solution" for the platform (i.e., the collection of known platform motions) in combination with the target altitude and position at two different times.

More specifically, the navigation solution for the platform includes the line of sight velocity in the navigation frame (i.e., the platform linear velocity), the line of sight acceleration in the navigation frame (the platform linear acceleration), the line of sight attitude with respect to the navigation frame, and the rotation rate of the platform with respect to the navigation frame. The target velocity then may be calculated as follows. Let $$\vec{V}_{los} = \begin{pmatrix} 1 \\ 0 \\ 0 \end{pmatrix}$$

be a unit vector in the direction of the line of sight, i.e., pointing along the x-axis of the optical frame. Given the attitude of the line of sight and the rotational rates of the gimbal (see Section V.D above), the attitude of the line of sight at time t and after a time dt can be computed in any desired coordinate system. In the navigation frame, $$^n\vec{V}_{los}^{target}(t) = C_b^n \cdot \begin{pmatrix} 1 \\ 0 \\ 0 \end{pmatrix};$$

$$^n\vec{V}_{los}^{target}(t+dt) = DCM(\text{rotation\_rate}) \cdot {}^n\vec{V}_{los}^{target}(t),$$

where DCM(rotation_rate) is the direction cosine matrix that corresponds to the rotation of the line of sight vector in the navigation frame in time dt. For small angles, the vector $^n\vec{V}_{los}^{target}(t+dt)$ can be computed by:

$$^n\vec{V}_{los}^{target}(t+dt) =$$
$$DCM(\text{pitch}+\text{delta\_pitch}, \text{roll}+\text{delta\_roll}, \text{hdg}+\text{delta\_hdg}) \cdot \begin{pmatrix} 1 \\ 0 \\ 0 \end{pmatrix}$$

where the changes in pitch, roll, and heading of the line of sight to the target in a given time interval may be recorded by a processor as the gimbal tracks the target.

The change in attitude of the line of sight toward the target may be sensed and used to calculate the rotation rate of the line of sight in at least two ways. If an internal inertial navigation system is used (e.g., an inertial measurement unit disposed inside the gimbal payload), it may sense the attitude of the line of sight directly. If an external inertial navigation system is used (e.g., an inertial measurement unit mounted elsewhere on the platform body), it may sense the attitude of the platform, which can then be rotated by the gimbal angles to compute the attitude of the line of sight at the relevant times.

Once the line of sight from the gimbal to the target is known as a function of time, it is possible to compute the target position as a function of time. For the purposes of this discussion it is assumed that the platform position is also known as a function of time, for example from GPS data. However, in some cases the platform position may be computed as a function of time using known or measured platform velocity and/or acceleration. In either case, determining the target position is a matter of finding the intersection of the line of sight vector from the known position of the gimbal with the ellipsoid surface of the earth. This is a straightforward geometric exercise that generally includes (i) computing the vector between the optical frame origin and the ellipsoid intersection point (the magnitude of which is sometimes referred to as the "slant range"), (ii) transforming this vector into the ECEF frame, and (iii) computing the target location as the vector sum of the gimbal position and the slant range vector:

$$^o\vec{X}_o^T = [\text{slant range}; 0; 0];$$

$$^n\vec{X}_o^T = C_b^n \times {}^o\vec{X}_o^T;$$

$$^e\vec{X}_o^T = C_g^e \times {}^n\vec{X}_o^T;$$

$$^e\vec{X}_e^T = {}^e\vec{X}_e^o + {}^e\vec{X}_o^T.$$

This calculation can be repeated as a function of time so that the velocity of the target can be computed:

$$^e\vec{V}^T(t) = \frac{{}^e\vec{X}_e^T(t+\Delta t) - {}^e\vec{X}_e^T(t)}{\Delta t}.$$

Once an initial target velocity has been determined, for example by using the calculation described above, the gimbal controller may be programmed to follow a point in space that moves with a constant velocity equal to the initially determined velocity. When the target does in fact move with constant velocity, this allows the system to correctly track the moving target with no additional operator input. However, for a target moving on the surface of the earth, the target velocity will generally not be exactly constant due to the curvature of the earth, even if the speed of the target is assumed constant. Therefore, tracking a target moving on the ground involves following the motion of the target as it moves on the curved ellipsoid of the earth's surface. This may be accomplished by finding the ellipsoid intersection at each iterated target position, i.e., $$^e\vec{X}_o^T(t+dt) = \text{Ellipsoid Intersect}({}^e\vec{X}_o^T(t) + {}^e\vec{V}^T(t)dt).$$

As mentioned above, in some cases it may be desirable to allow a user to input a target velocity change or correction, for example through the use of a user input device such as a joystick, as indicated at step 254 of FIG. 9. For instance, as described in more detail below, a nonzero joystick input may be transformed by a processor into a change in target velocity, and added to the previous target velocity by a velocity integrator. The new velocity then may be assumed constant (taking into account the curvature of the earth for a ground-based target, as described above) until further user input regarding velocity is provided.

More specifically, when user input regarding target velocity is received, this input is passed through a transducer configured to convert a signal received from the user input device into a corresponding change in gimbal orientation, as indicated at step 256. At step 258, the target velocity corresponding to the user-induced gimbal motion is determined. This can be accomplished, for example, by comparing the user-induced gimbal motion to the preexisting gimbal tracking motion, which has already been associated with a target velocity as described previously.

At step 260, a velocity integrator combines the change in target velocity associated with the user input with the previous value of the target velocity, through vector addition. Steps 254, 256, 258 and 260 may be repeated any number of times, depending on the user input. In other words, the user may have any desired effect on the target velocity communicated to the gimbal controller. The fact that the target velocity is integrated each time means that user input may be used primarily for target velocity changes and corrections, since the target velocity will be treated as constant (or constant along the ellipsoid) in the absence of user velocity input. The use of the joystick or other input device to control gimbal tracking in conjunction with a velocity integrator is thus somewhat analogous to the cruise control mechanism of an automobile, in the sense that user input is required for changes in velocity. In some embodiments, a non-integrated mode may be provided in which the velocity integrator is switched off. In that case, user input might be required to maintain any target velocity at all, or at least any target velocity other than a constant target velocity.

The velocity integrator may include various features to add convenience when providing user input relating to target velocity. For example, the integrator may include an adjustable gain feature that can be used to adjust the percentage of the user input to the transducer that is interpreted as a change in velocity, thus effectively allowing an adjustment to the sensitivity of the transducer to user input. For instance, a less sensitive setting may be more convenient in urban environments, where target velocities are generally expected to be smaller, whereas a less sensitive setting may be more convenient when viewing a highway, where target velocities are generally expected to be relatively large. In addition, the velocity integrator may include an optional time out decay mode, in which the target velocity decays toward zero after some predetermined amount of time without user input.

With or without user-supplied changes in target velocity, the target position may be propagated forward as a function of time, as indicated at step 262, based on the integrated value of target velocity. At step 264, the updated target position vector in the optical frame is determined, for instance by the methods described previously. At step 266, the target position vector is transformed into a gimbal line of sight correction, also as described previously, and at step 268, the calculated correction is communicated to the gimbal controller in the form of rates of change in azimuth and/or elevation. At step 271, the gimbal rotates in response to instructions from the gimbal controller. The resulting gimbal motion is responsive to the integrated target velocity, including any initially determined target velocity plus all user-supplied changes, while compensating for platform motions at the same time.

F. Input Filters

Various filters may be applied to the user input. For example, a combination of low-pass and high-pass filters may be applied so that brief user input, such as a tap on a joystick, is interpreted as a slight change or "nudge" in the position of the target rather than a change in target velocity. On the other hand, longer user input, such as a continuous push of a minimum duration on a joystick, may be interpreted as a change in the velocity of the target. Both types of joystick input may be processed sufficiently for a modified position and/or velocity of the target to be determined and transformed into gimbal tracking commands. Other similar filters may be provided to allow joystick input having particular duration, strength, or other qualities be interpreted as changes in the target position and/or velocity. Any such filters may be configured to be selectively turned on and off by the user.

VI. MOUNTING/CONTROL PORTIONS

A mounting or control portion may be any part of a gimbal apparatus that connects a gimbal assembly to a support platform and/or that carries electronics providing one or more aspects of gimbal apparatus control and/or data processing. The mounting/control portion may form an end region of a turret unit. Also, this portion may be unstabilized and may be termed a "skillet."

The mounting/control portion may support a gimbal assembly and may be connected directly to at least one gimbal and connected indirectly to one or more additional gimbals of the gimbal assembly. The mounting/control portion, in turn, may be attached to a support platform (see Section IX). The mounting/control portion may be mounted to a support platform via any suitable mechanism, with any suitable orientation. For example, when used with a vehicle, a mounting/control portion (and/or the corresponding turret unit) may be bottom-mounted, side-mounted, top-mounted, front-mounted, rear-mounted, externally mounted, internally mounted, and/or so on. Moreover, such mounting may be static or dynamic, for example, involving additional gimbal(s) to provide dynamic mounting. The mounting/control portion may carry and/or contain any suitable components of a turret unit, including a controller(s), power supply, electrical conduits or other electrical circuitry, a fan(s), and/or the like. Details of the mounting mechanism, including orientation and offsets, may be important in determining the various coordinate systems and coordinate transformations required to convert information regarding platform and target positions into line-of-sight pointing directions for the gimbal system.

VII. GIMBAL ASSEMBLIES

A gimbal assembly, as used herein, is a hierarchical arrangement of two or more pivotable members (gimbals). A gimbal assembly may include a higher-order gimbal pivotally coupled directly to a mounting portion. The gimbal assembly also may include a lower-order gimbal pivotally coupled directly to the higher-order gimbal and indirectly to the mounting portion, such that the lower-order gimbal is carried by the higher-order gimbal. As a result, pivotal motion of the higher-order gimbal in relation to the mounting portion results in collective pivotal motion of both gimbals, whereas pivotal motion of the lower-order gimbal may be independent of the higher-order gimbal. The gimbal assembly further may include any suitable number of additional lower-order gimbals that are pivotally coupled directly to a relatively higher-order gimbal and/or that carry an even lower-order gimbal.

A gimbal assembly may be configured to rotate a payload about any suitable or desired number of axes, including 2, 3, 4, 5, 6, or more axes. In some embodiments, some of the axes of rotation may be collinear or coplanar. The axes of rotation typically are either orthogonal to one another or parallel to (including collinear with) one another, although this is not required. In some embodiments, parallel axes of rotation, or substantially parallel axes, can be used to provide increased precision, with a first level of rotation about a first axis providing coarser large-magnitude adjustments and a second level of rotation about a second axis (parallel or nonparallel) to the first axis providing finer small-magnitude adjustments.

Each gimbal of a gimbal assembly may be capable of any suitable pivotal motion. The pivotal motion may be a complete revolution (360 degrees) or less than a complete revolution. For example, in bottom-mounted gimbal assemblies, the area above the payload will be occluded by the support platform, and so revolutions that would aim the payload toward the occluded area are unnecessary. In some embodiments, the gimbal assembly may include a hierarchical arrangement of major and minor gimbal pairs. The major gimbal pair may be a pair of gimbals having a relatively larger range of angular motion (such as greater than about 90 degrees). The minor gimbal pair may be a pair of gimbals that are pivotally coupled to the major gimbal pair (and indirectly to the mounting portion) and having a relatively smaller range of angular motion (such as less than about 90 degrees).

Each gimbal of a gimbal assembly may be driven controllably by a driver. An exemplary driver that may be suitable is described in U.S. Pat. No. 7,561,784, issued Jul. 14, 2009, which is incorporated herein by reference. The driver(s) may be controlled, at least in part, by the target velocity compensation system, to facilitate tracking a target such as a moving target.

VIII. PAYLOADS

A payload is any device that is carried and aimed by a gimbal assembly. The payload may include one or more detectors and/or emitters, among others. A detector generally comprises any mechanism for detecting a suitable or desired signal, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser or radar), sonic energy, and/or the like. The payload generally is in communication with a controller that sends signals to and/or receives signals from the payload. The payload may be coupled (generally via a controller) to a display such that signals from the payload may be formatted into a visual form for viewing on the display. The payload also may be coupled (again generally via a controller) to the target velocity compensation system, so that information about a target pertinent to tracking the target can be gathered, presented, and/or assessed.

In some embodiments, the payload may form a detection portion (or all) of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections and/or emissions induced by the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CODs), charge-injection devices (CIDs), complementary metal-oxide semiconductor (CMOS) arrays, photodiode arrays, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof. Special-purpose detectors may include millimeter-wave (MMW) imagers, light detection and ranging (LIDAR) imagers, and mine-detection sensors, among others.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, the imaging system may be capable of generating image signals based on reflection from a self-contained laser and/or other light or radiation source. The generated image may or may not contain range information. Such imagers may generate large amounts of heat. The present disclosure may enable the use and incorporation of light detection and ranging (LIDAR) systems, such as 3-D LIDAR systems, into gimbal systems in which the large amounts of associated heat would otherwise prevent their use.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application. For example, the imaging system may be configured to generate a first image signal representative of infrared radiation in a first waveband (e.g., short-wavelength infrared (SWIR)) and a second image signal representative of infrared radiation in a second waveband (e.g., long-wavelength infrared (LWIR)).

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging components, such as laser rangefinders, laser designators, laser illuminators, laser communication devices, polorarimeters, hyperspectral sensors, inertial measurement units (IMUs), and/or the like.

Further aspects of imaging systems that may be suitable for the gimbal system of the present disclosure are described in the following patent, which is incorporated herein by reference: U.S. Pat. No. 7,515,767, issued Apr. 7, 2009.

IX. SUPPORT PLATFORMS

The gimbal system of the present disclosure may include a turret unit supported by a support platform. A support platform, as used herein, generally refers to any mechanism for holding, bearing, and/or presenting a turret unit and its payload. The support platform may be moving, movable but stationary, or fixed in relation to the earth, and may be disposed on the ground, in the air or space, or on and/or in water, among others. In any case, the support platform may be selected to complement the function of the turret unit and particularly its payload.

The support platform may be movable, such as a vehicle. Exemplary vehicles include an aircraft or airborne device (e.g., a fixed-wing piloted aircraft, pilotless remote-controlled aircraft, helicopter, drone, missile, dirigible, aerostat balloon, rocket, etc.), a ground vehicle (e.g., a car, truck, motorcycle, tank, etc.), a watercraft (e.g., a boat, submarine, carrier, etc.), or the like. In this case, target velocity compensation may need to account for both target velocity and platform velocity.

The support platform may be fixed in position. Exemplary fixed support platforms may include a building, an observation tower, and/or an observation platform, among others. In some embodiments, the support platform may be a temporarily stationary movable support, such as a hovering helicopter and/or a parked car, truck, or motorcycle, among others. In this case, target velocity compensation may only need to account for target velocity.

A gimbal system with a moving, temporarily stationary, or fixed support platform may be used for any suitable application(s). Exemplary applications for a gimbal system include navigation, targeting, search and rescue, law enforcement, firefighting, and/or surveillance, among others.

X. DEFINITIONS

This section relates to the definitions of various technical terms. In general, technical terms used in the present disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation. The wavelength ranges lying above about 1 mm, which include microwave radiation and radio waves, may collectively be termed the radio spectrum.

Ultraviolet radiation. Electromagnetic radiation invisible to the human eye and having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Electromagnetic radiation visible to the normal human eye and having wavelengths from about 360 or 400 nanometers, just longer than ultraviolet radiation, to about 760 or 800 nanometers, just shorter than infrared radiation. Visible light typically may be imaged and detected by the unaided human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation. Electromagnetic radiation invisible to the human eye and having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., 3 and 5 µm) and between about 7,000 or 8,000 and 14,000 nm (i.e., 7 or 8 and 14 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VLWIR) (from about 15,000 nm to about 1 mm). Portions of the infrared, particularly portions in the far or thermal IR having wavelengths between about 0.1 and 1 mm, may alternatively, or in addition, be termed millimeter-wave (MMV) wavelengths.

Microwave Radiation. Electromagnetic radiation invisible to the human eye and having wavelengths from about 1 millimeter, just longer than infrared radiation, to about 1 meter, just shorter than radio waves.

Radio Waves. Electromagnetic radiation invisible to the human eye and having wavelengths greater than about 1 meter, just longer than microwave radiation. In practice, radio waves typically have wavelengths less than about 100,000 kilometers, which corresponds to extremely low frequency waves.

XI. EXAMPLES

This section describes selected embodiments of a gimbal system with target velocity compensation, presented as a series of numbered paragraphs. These examples are intended for illustration and should not be interpreted as limiting the entire scope of the present disclosure.

A. An optical system for tracking a moving target, comprising (1) a pointing device attachable to a support platform; (2) a sensor, supported by the pointing device, and pivotably orientable with respect to the support platform about a pair of nonparallel axes by controlled driven motion of the pointing device, to provide pan and tilt movement of the sensor, such that the sensor can be pointed at the target; (3) a user input device configured to allow a user to provide information regarding position and velocity of the target; and (4) a controller programmed to receive the information provided by the user and, based on that information, to prepare and transmit instructions to the pointing device to orient and maintain its line of sight toward the target, thereby allowing the sensor to track the target.

A1. The system of paragraph A, wherein the information provided by the user includes information used to determine a direction from the pointing device to the target, and wherein the controller is configured to calculate a corresponding position of the target using the determined direction.

A2. The system of paragraph A1, wherein a position of the support platform is determined by at least one of a global positioning system and an inertial navigation system, and wherein the controller is configured to calculate the position of the target using the position of the platform and the determined direction from the pointing device to the target.

A3. The system of paragraph A1, wherein the target is moving on the surface of the Earth, and wherein the controller is configured to calculate the position of the target by calculating the intersection of a line extending from the pointing device toward the target with an ellipsoid representing the surface of the Earth.

A4. The system of paragraph A, wherein the information provided by the user includes information used to determine a first direction from the pointing device toward the target at a first instant of time and a second direction from the pointing device toward the target at a second instant of time, and wherein the controller is configured to calculate a corresponding target velocity using the first and second determined directions.

A5. The system of paragraph A, wherein the controller is configured to compute a vector sum of (i) a change in target velocity associated with the information provided by the user and (ii) a previously determined target velocity, and to cause the pointing device to maintain its line of sight toward a position moving at a velocity corresponding to the vector sum.

A6. The system of paragraph A5, wherein the controller is configured to cause the pointing device to maintain its line of sight toward a position moving at a speed corresponding to a magnitude of the vector sum, in a direction along an ellipsoid representing the surface of the Earth.

A7. The system of paragraph A, wherein the controller is configured to interpret a first type of user input as a change in target velocity and a second type of user input as a change in target position.

A8. The system of paragraph A7, wherein the first type of user input is a continuous nonzero joystick input for a time greater than a predetermined minimum time, and the second type of user input is a nonzero joystick input for a time less than the predetermined minimum time.

A9. The system of paragraph A, wherein the controller is configured to cause the pointing device to maintain its line of sight toward the target while the support platform moves.

A10. The system of paragraph A, wherein the information provided by the user is sufficient to maintain the line of sight of the pointing device toward the target for an initial interval of time, and wherein the controller is configured to calculate an initial velocity of the target using a corresponding rate of change of attitude of the pointing device.

B. An optical device for tracking a moving target, comprising (1) a gimbal system attachable to a support platform; (2) an imaging system, supported by the gimbal system, and pivotably orientable with respect to the support platform about a pair of nonparallel axes by controlled driven motion of the gimbal system, to provide pan and tilt movement of the imaging system, such that a line of sight of the imaging system can be pointed at the target; (3) a display configured to present images of the target collected by the imaging system; (4) a user input device configured to allow a user to input information regarding successive positions of the target, based on images of the target presented on the display; and (5) a controller programmed to receive information from the user input device and, based on that information, to prepare and transmit instructions to the gimbal system to orient and maintain the line of sight of the imaging system toward the target while the target moves between two positions, thereby allowing the imaging system to track the target.

B1. The device of paragraph B, wherein the information provided by the user includes information used to determine successive directions from the imaging system to the target, and wherein the controller is configured to calculate successive positions of the target using the successive directions.

B2. The device of paragraph B1, wherein the controller is configured to calculate a target velocity using successive positions of the target.

B3. The device of paragraph B, wherein the target is moving on the surface of the Earth, and wherein the controller is configured to calculate each successive position of the target by determining the intersection of a line extending from the imaging system toward the target with an ellipsoid representing the surface of the Earth.

B4. The device of paragraph B, wherein the user input device is configured to allow a user to input information regarding a change in target velocity, and wherein the controller is configured to compute a vector sum of (i) the change in target velocity associated with the information provided by the user and (ii) a previously determined target velocity, and to cause the imaging system to maintain its line of sight toward a position moving at a velocity corresponding to the vector sum.

B5. The device of paragraph B4, wherein the controller is configured to interpret a first type of user input as a change in target velocity and a second type of user input as a change in target position.

B6. The device of paragraph B5, wherein the first type of user input is a continuous nonzero joystick input for a time greater than a predetermined minimum time, and the second type of user input is a nonzero joystick input for a time less than the predetermined minimum time.

B7. The device of paragraph B, wherein the controller is configured to cause the imaging system to maintain its line of sight toward the target while the support platform moves.

C. A method of tracking a moving target, comprising (1) bringing the target into a field of view of an imaging system; (2) calculating an initial velocity of the target based on orientation of a line of sight of the imaging system toward the target at two different times; and (3) keeping the target in the field of view while the target is moving by either (i) causing the field of view to track a point moving with velocity corresponding to the initial velocity of the target, or (ii) receiving user input relating to a change in target velocity, using the user input to determine the change in target velocity, and causing the field of view to track a point moving with a velocity corresponding to the vector sum of the initial velocity and the change in target velocity.

C1. The method of paragraph C, wherein the velocity corresponding to the initial velocity is a projection of the initial velocity onto an ellipsoid representative of the Earth's surface, and wherein the velocity corresponding to the vector sum of the initial velocity and the change in target velocity is a projection of the vector sum onto the ellipsoid.

C2. The method of paragraph C, wherein calculating the initial velocity of the target includes calculating the position of the target at the two different times by determining at each time the intersection of the line of sight of the imaging system with an ellipsoid representative of the Earth's surface.

C3. The method of paragraph C, wherein keeping the target in the field of view includes interpreting a first type of user input as relating to a change in target position and interpreting a second type of user input as relating to a change in target velocity.

C4. The method of paragraph C3, wherein the first type of user input is a nonzero joystick input having a duration less than a predetermined minimum duration, and the second type of user input is a nonzero joystick input having a duration greater than the predetermined minimum duration.

C5. The method of paragraph C, wherein keeping the target in the field of view includes compensating for a nonzero velocity of the imaging system relative to the Earth.

D. A method of tracking a moving target, comprising (1) receiving information regarding an initial position of the target; (2) directing a gimbal to point a tracking device toward the initial position of the target; (3) receiving information regarding a subsequent position of the target; (4) directing the gimbal to point the tracking device toward the subsequent position of the target; (5) calculating an initial target velocity using a rotation rate of a line of sight from the tracking device to the target as the line of sight rotates between the initial position of the target and the subsequent position of the target; and (6) directing the gimbal to point the tracking device to follow a point moving with a velocity corresponding to the initial target velocity, thereby tracking the target.

D1. The method of paragraph D, further comprising (7) receiving user input relating to at least one of a change in target position and a change in target velocity; (8) calculating the change in target position and the change in target velocity corresponding to the user input; (9) directing the gimbal to point the tracking device toward a position including the change in target position; and (10) directing the gimbal to follow a point moving with a velocity corresponding to a vector sum of the initial target velocity and the change in target velocity.

D2. The method of paragraph D1, wherein calculating the change in target position and the change in target velocity includes determining which user input relates to a change in target position and which user input relates to a change in target velocity.

D3. The method of paragraph D2, wherein determining which user input relates to a change in target position and which user input relates to a change in target velocity includes interpreting nonzero user input having a continuous duration less than a predetermined minimum as a change in target position, and interpreting nonzero user input having a continuous duration greater than a predetermined minimum as a change in target velocity.

D4. The method of paragraph D, further comprising (7) determining the initial position of the target by calculating an intersection of a line of sight of the tracking device with an ellipsoid representative of the surface of the Earth when the tracking device points toward the initial position; and (8) determining the subsequent position of the target by calculating an intersection of a line of sight of the tracking device with an ellipsoid representative of the surface of the Earth when the tracking device points toward the subsequent position.

D5. The method of paragraph D, wherein directing the gimbal to follow the moving point includes compensating for known movement of the gimbal.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements. Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. An optical system for tracking a moving target, comprising:
   a pointing device attachable to a flight capable support platform, wherein the support platform provides information to a controller regarding a motion of the support platform;
   a sensor, supported by the pointing device and pivotably orientable with respect to the support platform about a pair of nonparallel axes by controlled driven motion of the pointing device to provide pan and tilt movement of the sensor, such that the sensor can be pointed toward the moving target;
   a user input device configured to receive information regarding position and velocity of the moving target, wherein the information regarding position and velocity is not provided by the moving target;
   wherein the controller is configured to:
      receive the information regarding position and velocity of the moving target;
      receive the information regarding the motion of the support platform;
      determine a line of sight vector extending from the pointing device toward the moving target using the received information regarding the position and velocity of the moving target and the motion of the support platform; and
      provide the line of sight vector to the pointing device to orient and maintain the sensor's line of sight toward the moving target based on the line of sight vector.

2. The system of claim 1, wherein the information provided by the user input device further includes information used to determine a direction from the pointing device to the moving target, wherein the controller is configured to calculate a corresponding position of the moving target using the determined direction, and wherein an initial target velocity is determined by the controller from an initial position of the target and a subsequent position of the target provided by the user input device.

3. The system of claim 2, wherein a position of the support platform is determined by at least one of a global positioning system and an inertial navigation system, and wherein the controller is configured to calculate the position of the moving target using the position of the support platform and the determined direction from the pointing device to the moving target.

4. The system of claim 1, wherein the controller is configured to compute a vector sum of (i) a change in target velocity associated with the information provided by the user input device and (ii) a previously determined target velocity, and to cause the pointing device to maintain its line of sight toward a position moving at a velocity corresponding to the vector sum.

5. The system of claim 1, wherein the controller is configured to interpret a first type of information provided by the user input device as a change in target velocity and a second type of information provided by the user input device as a change in target position.

6. The system of claim 5, wherein the first type of information is a continuous nonzero joystick input for a time greater than a predetermined minimum time, and the second type of information is a nonzero joystick input for a time less than the predetermined minimum time.

7. The system of claim 1, wherein the information provided by the user input device is sufficient to maintain the line of sight of the pointing device toward the moving target for an initial interval of time, and wherein the controller is configured to calculate an initial velocity of the moving target using a corresponding rate of change of attitude of the pointing device.

8. A method of tracking the moving target using the optical system of claim 1, the method comprising:
   acquiring the moving target in a field of the sensor;
   calculating an initial velocity of the moving target based on an orientation of a line of sight of the sensor toward the moving target at two different times; and
   keeping the moving target in the field of view while the target is moving by either (i) causing the field of view to track a point moving with velocity corresponding to the initial velocity of the moving target, or (ii) receiving information relating to a change in target velocity, using the information to determine the change in target velocity, and causing the field of view to track a point moving with a velocity corresponding to a vector sum of the initial velocity and the change in target velocity, wherein the information relating to the change in target velocity is not provided by the moving target.

9. The method of claim 8, wherein keeping the moving target in the field of view includes interpreting a first type of information as relating to a change in target position and interpreting a second type of information as relating to the change in target velocity, wherein the information relating to the change in target position is not provided by the moving target.

10. The method of claim 9, wherein the first type of information is a nonzero joystick input having a duration less than a predetermined minimum duration, and the second type of information is a nonzero joystick input having a duration greater than the predetermined minimum duration.

11. The method of claim 8, wherein keeping the moving target in the field of view includes compensating for a nonzero velocity of the sensor relative to the Earth.

12. An optical device for tracking a moving target, comprising:

a gimbal system attachable to a flight capable support platform, wherein the support platform provides information to a controller regarding a motion of the platform;
an imaging system, supported by the gimbal system and pivotably orientable with respect to the support platform about a pair of nonparallel axes by controlled driven motion of the gimbal system to provide pan and tilt movement of the imaging system, such that a line of sight of the imaging system can be pointed toward the moving target;
a display configured to present images of the moving target collected by the imaging system;
a user input device configured to receive information regarding successive positions of the moving target, based on images of the moving target presented on the display, wherein the information regarding the successive positions is not provided by the moving target; and
wherein the controller is configured to:
   receive the information regarding the successive positions of the moving target;
   receive the information regarding the motion of the support platform;
   determine a line of sight vector extending from the imaging system toward the moving target using the received information regarding the successive positions of the moving target and the motion of the support platform; and
   provide the line of sight vector to the gimbal system to orient and maintain the line of sight of the imaging system toward the moving target based on the line of sight vector while the target moves between two positions, thereby allowing the imaging system to track the target.

13. The device of claim 12, wherein the user input device is configured to receive information regarding a change in target velocity, and wherein the controller is configured to compute a vector sum of (i) the change in target velocity associated with the information regarding successive positions of the moving target provided by the user input device and (ii) a previously determined target velocity, and to cause the imaging system to maintain its line of sight toward a position moving at a velocity corresponding to the vector sum.

14. The device of claim 13, wherein the controller is configured to interpret a first type of information provided by the user input device as a change in target velocity and a second type of information provided by the user input device as a change in target position.

15. The device of claim 12, wherein the controller is configured to cause the imaging system to maintain its line of sight toward the moving target while the support platform moves.

16. A method of tracking the moving target using the optical device of claim 12, the method comprising:
   receiving information regarding an initial position of the moving target, wherein the information regarding the initial position of the moving target is not provided by the moving target;
   directing the gimbal system to point the imaging system toward the initial position of the moving target;
   receiving information regarding a subsequent position of the moving target, wherein the information regarding the subsequent position of the moving target is not provided by the moving target;
   directing the gimbal system to point the imaging system toward the subsequent position of the moving target;

calculating an initial target velocity using a rotation rate of a line of sight from the imaging system to the target as the line of sight rotates between the initial position of the moving target and the subsequent position of the moving target; and directing the gimbal system to point the imaging system to follow a point moving with a velocity corresponding to the initial target velocity, thereby tracking the target while the target moves.

17. The method of claim 16, further comprising:

receiving information relating to at least one of a change in target position and a change in target velocity, wherein the information relating to at least one of the change in target position and the change in target velocity is not provided by the moving target;

calculating the change in target position and the change in target velocity corresponding to the received information relating to at least one of the change in target position and the change in target velocity;

directing the gimbal system to point the imaging system toward a position including the change in target position; and directing the gimbal system to follow a point moving with a velocity corresponding to a vector sum of the initial target velocity and the change in target velocity.

18. The method of claim 17, wherein the calculating the change in target position and the change in target velocity includes determining which received information relates to the change in target position and which received information relates to the change in target velocity.

19. The method of claim 18, wherein the determining which received information relates to the change in target position and which received information relates to the change in target velocity includes interpreting nonzero received information having a continuous duration less than a predetermined minimum as the change in target position, and interpreting nonzero received information having a continuous duration greater than a predetermined minimum as the change in target velocity.

20. The method of claim 16, wherein the directing the gimbal system to point the imaging system toward the moving target includes compensating for known movement of the gimbal system.

* * * * *